United States Patent [19]

Onoda et al.

[11] 4,185,599
[45] Jan. 29, 1980

[54] CONTROL SYSTEM FOR VARYING THE AMOUNT OF SCAVENGING AIR TO BE ADMITTED TO INTERNAL COMBUSTION ENGINE

[75] Inventors: Michio Onoda, Yokohama; Yasuo Nakajima, Yokosuka; Kunihiko Sugihara; Shin-ichi Nagumo, both of Yokohama, all of Japan

[73] Assignee: Nissan Motor Company, Limited, Yokohama, Japan

[21] Appl. No.: 867,620

[22] Filed: Jan. 6, 1978

[30] Foreign Application Priority Data

Jan. 8, 1977 [JP] Japan .................. 52-966

[51] Int. Cl.² ................. F02D 39/02; F02B 33/00
[52] U.S. Cl. ................. 123/75 B; 123/119 D; 123/119 EC
[58] Field of Search ............. 123/75 B, 76, 119 D, 123/124 R, 26, 119 EC

[56] References Cited

U.S. PATENT DOCUMENTS

| 2,818,931 | 1/1958 | Mallory | 123/75 B |
| 4,077,207 | 3/1978 | Hattori et al. | 123/119 EC |
| 4,077,363 | 3/1978 | Noguchi et al. | 123/75 B |
| 4,083,341 | 4/1978 | Brettschneider et al. | 123/119 D |

FOREIGN PATENT DOCUMENTS 47-43366  11/1972  Japan ................. 123/75 B

Primary Examiner—Charles J. Myhre
Assistant Examiner—M. Moy
Attorney, Agent, or Firm—Schwartz, Jeffery, Schwaab, Mack, Blumenthal & Koch

[57] ABSTRACT

Control system is adapted for an internal combustion engine in which a jet of air is injected into a combustion chamber via a second intake valve during a period overlapping an exhaust cycle and the subsequent intake cycle for expelling residual gas within the combustion chamber in order to reduce residual gas fraction of charge for the subsequent combustion within the combustion chamber. The system comprises a source of compressed air having a constant pressure, an injection passageway leading from the source toward the second intake valve, a flow control valve fluidly disposed in the injection passageway, and means whereby the flow control valve will vary effective flow area of the injection passageway in response to a signal indicative of the flow rate of fluid passing through the engine induction passageway.

13 Claims, 6 Drawing Figures

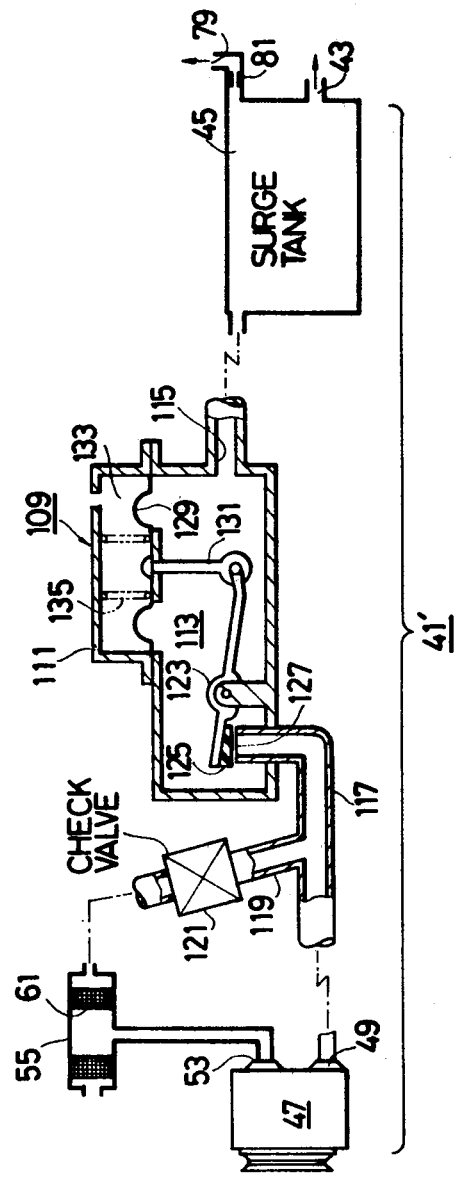

CONTROL SYSTEM FOR VARYING THE AMOUNT OF SCAVENGING AIR TO BE ADMITTED TO INTERNAL COMBUSTION ENGINE

BACKGROUND OF THE INVENTION

This invention relates to an engine system including a four cycle internal combustion engine having a second intake valve openable during a period overlapping an exhaust cycle and the subsequent intake cycle to permit the admission of compressed air to a combustion chamber, and more particularly to a control system for varying the amount of air to be admitted to the combustion chamber in response to the intake air flow.

One engine system is known in which an air fuel mixture is admitted to a combustion chamber by a first intake valve during an intake cycle and air is admitted to the combustion chamber by a second intake valve during the intake cycle to swirl around the cylinder axis to produce a stratified charge comprising an ignitable cloud in the proximity of the electrode of a spark plug.

In another known engine system, an air fuel mixture is admitted to a combustion chamber by a first intake valve to swirl around the cylinder axis during an intake cycle and air is admitted to the combustion chamber by a second intake valve during the intake cycle to swirl within a plane substantially parallel to the axial plane containing the cylinder axis therein to bring out fast stable combustion. In this engine, the second intake valve is so arranged as to direct a jet of air toward the electrode of a spark plug to scavenge the same.

Still another engine system is known in which an air fuel mixture is admitted to a combustion chamber by a first intake valve during an intake cycle to swirl around the cylinder axis in one direction and air is admitted to the combustion chamber by a second intake valve during the initial stage of the intake cycle to swirl around the cylinder axis but in the opposite direction to produce a stratified charge comprising an ignitable cloud in the proximity of the electrode of a spark plug.

In these engine systems described above, under idling or deceleration conditions when a great deal of residual gas exists within a combustion chamber, smooth engine operation could not be expected because the air-fuel ratio supplied to the engine is set lean and because of the existance of the great deal of residual gas within the combustion chamber under these conditions.

The admission of air in these engines is effected by a second intake valve and under atmospheric pressure, and no precise control of the amount of air to be admitted is effected which might lead to excessive deviation of the air-fuel ratio within the combustion chamber from a certain optimum range.

Another engine system is known in which air is admitted to a combustion chamber during the last stage of a compression cycle so as to prevent excessive rise in heat within the combustion chamber and the admission of air is again effected during the last stage of the subsequent exhaust cycle to absorb heat from an exhaust valve and the electrode of a spark plug. In this engine system a source of compressed air is used for the admission of air.

In another known engine system, the admission of air is effected during the last stage of an expansion or combustion cycle and the subsequent exhaust cycle for the purpose of promoting oxidation of HC and CO contained in the exhaust gases.

In any one of the engine systems described above however, the performance, in power output and fuel consumption, at full load operating condition of the engine is not sufficient, requiring further improvement.

It is proposed, in still another known engine system, to admit scavenging air to a combustion chamber during an exhaust cycle so as to expel the residual gas out of the combustion chamber. Although, in this engine system, the scavenging is carried out, it is impossible to lean out the air fuel mixture.

SUMMARY OF THE INVENTION

It is a main object of the invention to provide an engine system in which the power output has been increased and the fuel consumption has been improved without any increase in the total displacement volume of the engine.

It is another object of the invention to provide an engine system in which the admission of scavenging air to a combustion chamber is effected during a period overlapping an exhaust cycle and the subsequent intake cycle in order to expel the residual gas out of the combustion chamber and to lean out the air fuel mixture admitted to the combustion chamber in order to reduce fuel consumption.

It is still another object of the invention to provide an engine system in which, in order to eliminate the possibility that uncontrolled air admission to a combustion chamber during an intake cycle might cause excessive deviation of the air-fuel ratio of a charge within the combustion chamber from a certain optimum range, which causes rough engine operation, a control system is provided for varying the amount of scavenging air to be admitted to the combustion chamber in response to the intake air flow and the induction vacuum.

BRIEF DESCRIPTION OF THE DRAWINGS

The invention will be described hereinafter in connection with the accompanying drawings, in which:

FIG. 3 is a partial sectional view of a second embodiment of the invention, showing a modification of a source of compressed air using a pressure regulator instead of a simple relief valve used in FIG. 1;

DESCRIPTION OF THE PREFERRED EMBODIMENTS

Figure 1:
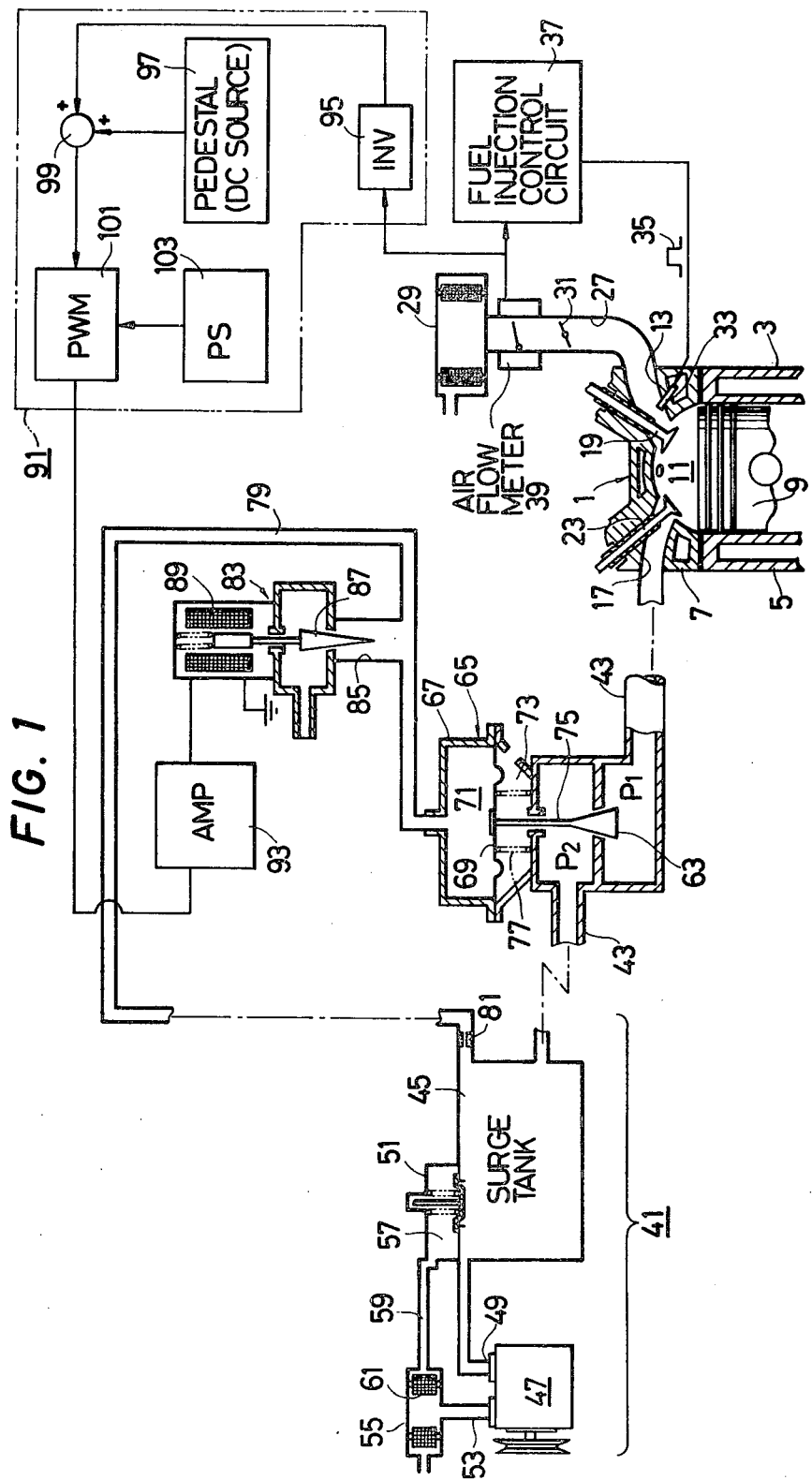
FIG. 1 is a diagrammatic sectional view of a first embodiment of an engine system of the invention having a fuel injection internal combustion engine including a second intake valve for the purpose of admitting scavenging air to a combustion chamber, and a control system for varying the amount of scavenging air to be admitted to the combustion chamber.
Figure 2:
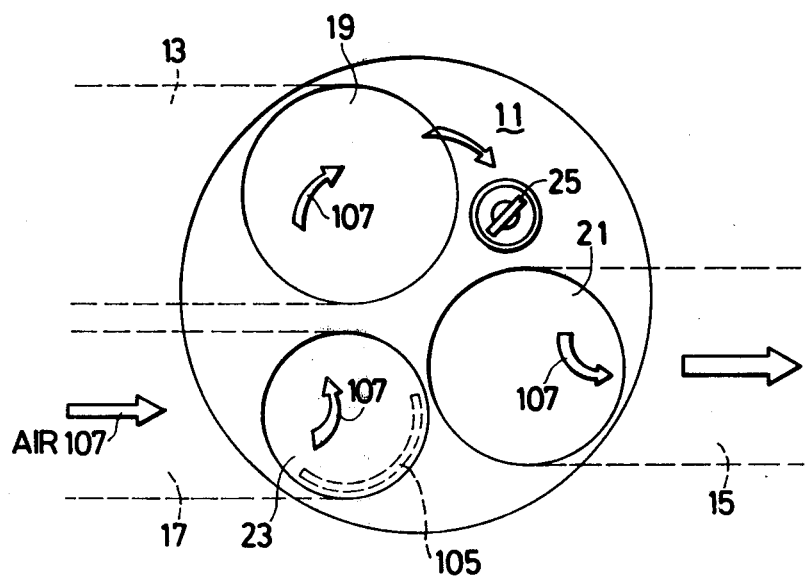
FIG. 2 is a top view of a valve arrangement of a cylinder of the internal combustion engine shown in FIG. 1.

Referring to the drawings and particularly to FIGS. 1 and 2, an engine system of the invention is illustrated which comprises a four-cycle internal combustion engine 1 having a cylinder block 3 formed with a plurality of cylinders, only one being shown at 5, and a cylinder head 7 to close the cylinders. Each cylinder 5 has a piston 9 reciprocating therein and piston 9, cylinder 5 and cylinder head 7 cooperate to define a combustion chamber 11. Cylinder head 7 has a first intake port passage 13, an exhaust port passage 15 and a second intake port passage 17, all of which are open to combustion chamber 11. Supported by cylinder head are a first intake valve 19 closing first intake port passage 13, an exhaust valve 21 closing exhaust port passage 15 and a second intake valve 23 closing second intake port passage 17. First intake valve 19 is adapted to open to perform an intake cycle, while, exhaust valve 21 is adapted to open to perform an exhaust cycle and their timings are substantially similar to those of a conventional internal combustion engine having a single intake valve and a single exhaust valve. Designated by the reference numeral 25 is the electrode of a spark plug (see FIG. 2).

An induction passage 27 leads from an air cleaner 29 toward cylinder head 7 to connect with each first intake port passage 13 and has a throttle valve 31 therein to control the flow of air therethrough. Opening into each first intake port passage 13 is a fuel injection nozzle 33. Fuel injection nozzle 33 is operable upon reception of a drive pulse 35 whose width varies in response to changes in the flow rate of air through air induction passageway 27. Drive pulse 35 is generated by a fuel injection control circuit 37. An air flow meter 39 is disposed in induction passageway 27 upstream from throttle valve 31 to generate an output signal which is an electric voltage signal indicative of the flow rate of air through induction passageway 27. The magnitude of the electric voltage signal will increase with increasing flow rate of air through induction passageway. This signal is fed to fuel injection control circuit 37.

Second intake valve 23 is adapted to open during a period overlapping an exhaust cycle and the subsequent intake cycle to effect admission of air to combustion chamber 11. More particularly, the valve opening of second intake valve 23 commences during the last stage of an exhaust cycle and terminates during the initial stage of the subseqent intake cycle.

A source of compressed air 41 is provided to supply a scavenging air to each second intake port passage 17 through an air passageway 43.

Source of compressed air 41 includes a surge tank 45 with which injection passageway 43 connects, an air pump 47 having a discharge port 49 connecting with surge tank 45 and a pressure relief valve 51. A suction port 53 of air pump 47 is connected to an air cleaner 55 to take in atmospheric air through air cleaner 55. Air pump 47 is drivingly connected to engine 1 to supply a compressed air increasing in pressure with increasing of the engine speed to surge tank 45. The pressure within surge tank 45 is kept constant owing to the function of pressure relief valve 51 having a valve chamber 57 which is in constant communication with ambient atmosphere preferably through a relief conduit 59 leading from valve chamber 57 to air cleaner 55. Relief conduit 59 connects with air cleaner 55 such that air from relief conduit 59 will pass through a filter element 61 toward suction port 53 of air pump 47.

A flow control valve 63 is fluidly disposed in injection passageway 43 and controllably connected to a positive pressure motor 65 which in response to a positive pressure applied thereto will actuate flow control valve 63.

Pressure motor 65 includes a housing 67 and a diaphragm member 69 having an upper side subject to a positive pressure within a power chamber 71 and a lower side subject to atmospheric pressure within an atmosphere chamber 73 communicating with the ambient atmosphere. Flow control valve 63 is fixedly connected to diaphragm member 69 through a valve stem 75 sealingly projecting into atmosphere chamber 73. A spring 77 is arranged within atmosphere chamber 73 to bias valve stem 75 upwardly (viewing in FIG. 1) toward a position, as illustrated, in which the valve opening is minimum or valve 63 is closed, while, diaphragm member 69 urges valve stem 75 to move downwardly, against the bias of spring 77, toward another position in which the valve opening is maximum or valve 63 is fully open as the positive pressure within power chamber 71 increases.

Power chamber 71 is connected to surge tank 45 by a pressure conduit 79 having formed therein an orifice 81. A pressure regulator valve 83 in the form of a solenoid actuated valve includes a vent port or passge 85 opening to pressure conduit 79 at a position intermediate power chamber 71 and orifice 81, a valve element 87 for controlling the amount of air flowing through vent port 85 toward the ambient atmosphere from pressure conduit 79 to cause a reduction in pressure transmitted to power chamber 71, and a solenoid actuator 89 to operate valve member 87 in response to a control signal supplied thereto from a control unit 91 through an amplifier 93.

Referring to control unit 91, the electric voltage signal output by air flow meter 39 indicative of the flow rate of air through induction passageway 27 will be inverted by an inverter 95 and then put on a pedestal 97 at a summing junction 99 to generate an electric voltage signal which varies inversely proportionally to the flow rate of air through the induction passageway. This electric voltage signal is fed to a pulse width modulator 101 in which the pulse width of a pulse generated by a pulse source 103 is modified to increase with increasing of this voltage signal from summing junction 99. The thus modulated pulse by pulse width modulator 101 is supplied to solenoid actuator 89 through amplifier 93 to energize solenoid actuator 89 to energize the same to cause valve element 87 to open vent port 85 during a duration corresponding to the pulse width.

It will now be noted that since pressure regulator valve 83 is normally closed and is open upon energization of solenoid actuator 89, the amount of air vented to the ambient atmosphere through vent port 85 will increase as the pulse width of the pulse supplied to amplifier 93 increases. This means that the magnitude of positive pressure within the power chamber will decline with increasing pulse width of the pulse supplied to amplifier 93. In other words, the magnitude of positive pressure within power chamber 71 will increase as the pulse width of the pulse supplied to amplifier 93 decreases. Thus, it will now be understood, from the fact that the pulse width of the pulse supplied to amplifier 93 will decrease as the electric voltage output from air flow meter 39 increases and this electric voltage will increase increasing of the flow rate of air through induction passageway 27, that the magnitude of positive pressure within power chamber 71 will increase as the flow rate of air through induction passageway 27 increases. It follows that the valve opening the flow control valve 63, i.e., the effective flow area through injection passageway 43 will increase substantially in proportion to increasing of the flow rate of air through induction passageway 27.

Although in the engine system shown in FIG. 1 the electric voltage signal output by air flow meter 39, which is indicative of the flow rate of air passing through induction passageway 27, is used as a control factor, drive pulse 35 for fuel injection nozzle 33 may be used as the control signal to be used as a control factor to control the amount of air flow through vent port 85. In this case, instead of pressure regulator 83 of the normally open type, a pressure regulator valve of a normally open type must be used which normally permits vent port 85 to open to the ambient atmosphere but will close vent port 85 upon energization of a solenoid actuator that is energized upon receiving a pulse.

It will be noted that since one end of injection passageway 43 is exposed to compressed air having a constant pressure within surge tank 45 and each second intake port passage 17 with which injection passageway 43 connects is openable to combustion chamber 11 to be exposed to induction vacuum created therein, the flow rate of scavenging air passing through injection passageway 43 toward combustion chamber 11 will vary in response to changes in the engine induction vacuum and the valve opening degree that varies in response to changes in the flow rate of intake air through induction passageway 27. Thus, the amount of scavenging air to be admitted to combustion chamber 11 via second intake valve 23 will vary in response not only to changes in the intake air flow but also to changes in the induction vacuum.

The engine system described above in connection with FIGS. 1 and 2 will operate as follows:

When, in operation of engine 1, air pump 47 will supply a compressed air to surge tank 45 at pressure that increases with increasing engine speed. The pressure within surge tank 45 is, however, kept constant by relief valve 51. Second intake valve 23 will open during the last stage of an exhaust cycle and close during the initial stage of the subsequent intake cycle and it is during this valve opening period that scavenging air will be admitted to combustion chamber 11 from surge tank 45 through injection passageway 43 past flow control valve 63 and through second intake port passage 17. Because second intake valve 23 is formed with a valve shroud 105, as shown in FIG. 2, to impart a force to inflowing scavenging air to swirl in the direction as denoted by arrows 107 in FIG. 2, the residual gas will be effectively expelled out of combustion chamber 11 through exhaust port passage 15 with the scavenging air.

As explained before, pressure within power chamber 71 will increase as the rate of air through induction passageway 27 increases. Thus, the valve opening of valve 63 will increase as the flow rate of air through induction passageway 27 increases, thus increasing the effective flow area of injection passageway 43. If the valve opening of valve 63 were fixed, the amount of scavenging air admitted to combustion chamber 11 would vary in proportion to the difference between an upstream pressure ($P_2$) from flow control valve 63 and a downstream pressure ($P_1$) from flow control valve 63. This means that the amount of scavenging air admitted to combustion chamber 11 would vary in proportion to the induction vacuum because upstream pressure $P_2$ is equal to the pressure within surge tank 45 and is constant and downstream pressure $P_1$ is equal to induction vacuum created within combustion chamber 11 during each intake cycle. Practically, the valve opening of flow control valve 63 will vary in proportion to the flow rate of air through induction passageway 27. Therefore the amount of scavenging air admitted to combustion chamber 11 during the valve opening period of second intake valve 23 will vary in response to changes in the induction vacuum and to changes in the intake air flow.

Referring to the embodiment shown in FIG. 3, it is substantially similar to the FIG. 1 embodiment except that, in FIG. 3, a source of compressed air 41' is used instead of the counterpart 41 shown in FIG. 1. Source of compressed air 41' includes a pressure regulator 109 which has a housing 111. Within housing 111 is formed a regulating chamber 113 which communicates with a surge tank 45 through an outlet port 115 opening thereto and which is communicable with an air pump 47 through an inlet conduit 117 leading from the discharge port 49 of air pump 47 toward and projects into regulating chamber 113. A relief conduit 119 provided with a check valve 121 leads from inlet conduit 117 toward an air cleaner 55 connected to the suction port 53 of air pump 47. Within regulating chamber 113 a lever 123 is rotatably mounted. Lever 123 has one arm carrying a valve element 125 adapted to close an inlet port 127 at the end of inlet conduit 117 opening to regulating chamber 113 and an opposite arm operatively connected with a diaphragm member 129 by a connecting rod 131 that is securely attached to diaphragm member 129. Diaphragm member 129 is mounted within housing 111 and separates an atmosphere chamber 133 from regulating chamber 113. A spring 135 is mounted within atmosphere chamber 133 to bias connecting rod 131 downwardly (viewing in FIG. 3) toward a position in which valve element 125 opens inlet port 127 to establish fluid communication between air pump 47 and regulating chamber 113, admitting compressed air from air pump 47 to regulating chamber 113 thus causing an increase in pressure within regulating chamber 113. As the pressure within regulating chamber 113 rises, diaphragm member 129 will be flexed upwardly (viewing in FIG. 3) to move connecting rod 131 upwardly toward a position in which valve element 125 closes inlet port 127 to prevent fluid communication between air pump 47 and regulating chamber 113, thus preventing air from entering into regulating chamber 113. It will be noted that with this pressure regulator 109, the pressure within regulating chamber 113 will be kept substantially constant and thus the pressure within surge tank 45 that is in constant communication with regulating chamber 113 will also be kept at the same constant pressure.

Figure 6:
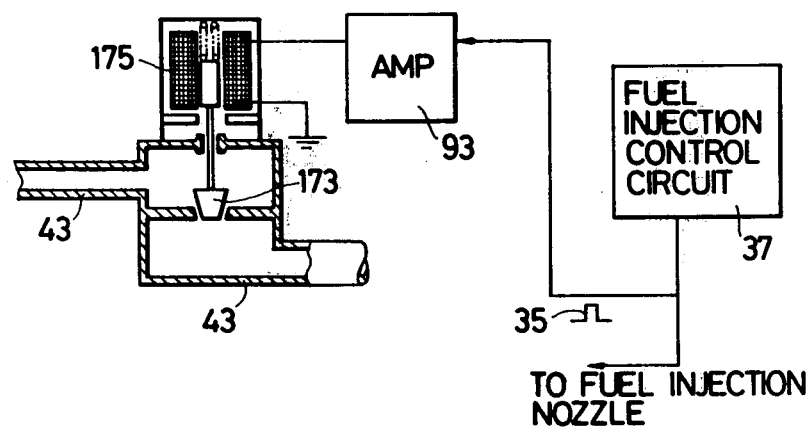
FIG. 6 is a similar view to FIG. 4, showing a fifth embodiment of the invention.
Figure 4:
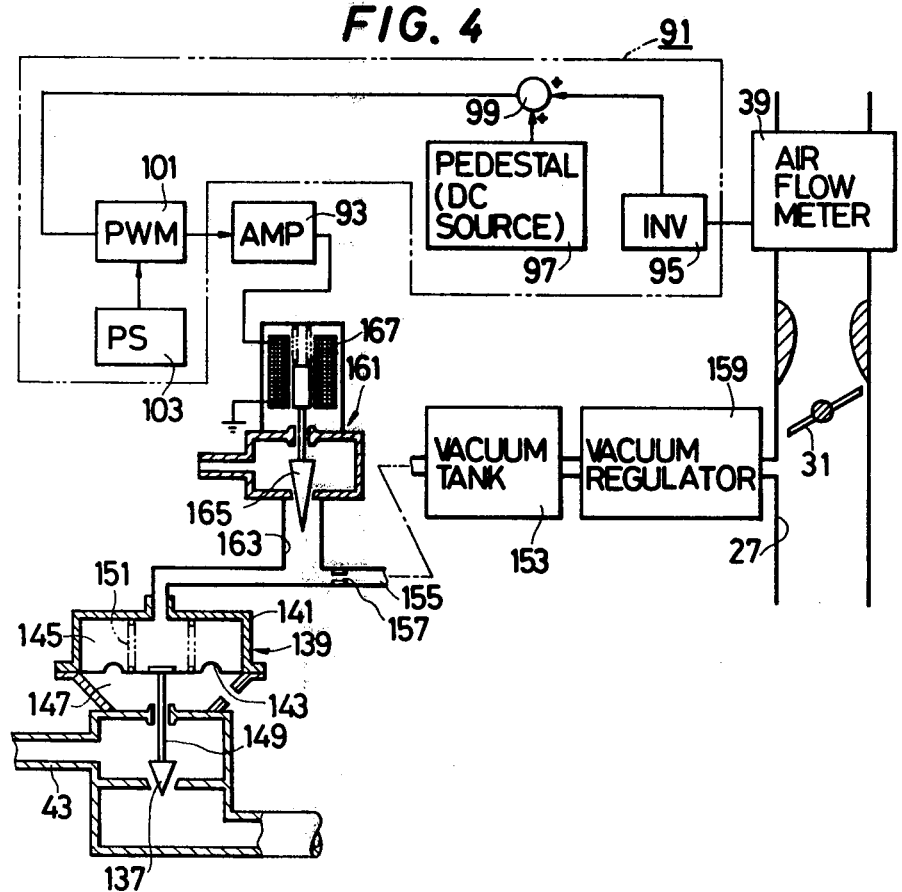
FIG. 4 is a partial sectional view of a third embodiment of the invention, showing a modified flow control valve.
Figure 5:
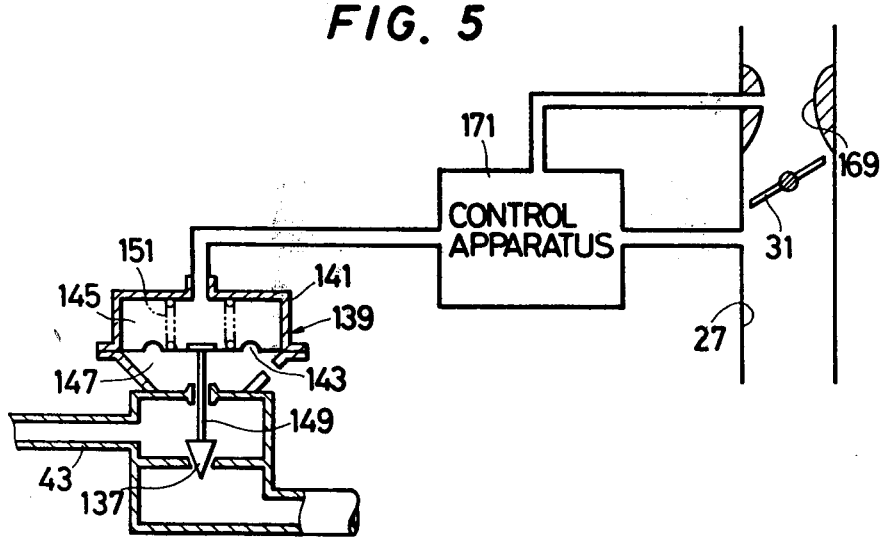
FIG. 5 is a similar view to FIG. 4 showing a fourth embodiment of the invention.

The other embodiments, which differ from the embodiment shown in FIGS. 1 or 3 in a flow control valve and control means whereby the flow control valve will vary effective flow area of an injection passageway, are illustrated in FIGS. 4–6, respectively.

Referring to the embodiment shown in FIG. 4, a flow control valve 137 is fluidly disposed in an injection passageway 43 and controllably connected to a vacuum motor 139 which will actuate flow control valve 137 in response to a vacuum applied thereto.

Vacuum motor 139 includes a housing 141 and a diaphragm member 143 having an upper side subject to a vacuum within a vacuum chamber 145 and a lower side subject to atmospheric pressure within an atmosphere chamber 147 communicating with the ambient atmosphere. Flow control valve 137 is fixedly attached to diaphragm member 143 by a valve stem 149 sealingly projecting into atmosphere chamber 147. A spring 151 is arranged within vacuum chamber 145 to bias valve stem 149 downwardly (viewing in FIG. 4) toward a position, as illustrated, in which the valve opening is minimum, while, diaphragm member 143 urges valve stem 149 upwardly, against the bias of spring 151, toward another position in which the valve opening is maximum as the vacuum within vacuum chamber 145 increases.

Vacuum chamber 145 is connected to a vacuum tank 153 by a vacuum conduit 155 having formed therein an orifice 157. Vacuum tank 153 communicates with a source of the induction vacuum, but under the control of a vacuum regulator 159 so that the vacuum within vacuum tank 153 is kept constant. A pressure regulator 161 in the form of a normally closed type solenoid actuated valve includes an air bleed port or passage 163 opening to vacuum conduit 155 at a position intermediate vacuum chamber 145 and orifice 157, a valve element 165 for controlling the amount of bleeding air flowing through air bleed port 163 to cause a reduction in vacuum transmitted to vacuum chamber 145, and a solenoid actuator 167 to operate valve member 163 in response to a control signal supplied thereto from a control unit 91 through an amplifier 93.

The operation of this embodiment is substantially similar to the preceding embodiments shown in FIG. 1 or 3 except that a control vacuum varying substantially in proportion to the flow rate of air through induction passageway 27 is used instead of a control positive pressure varying substantially in proportion to the flow rate of air through induction passageway 27 (see FIG. 1).

Referring to the embodiment shown in FIG. 5, it differs from the FIG. 4 embodiment in that a control vacuum transmitted to a vacuum chamber 145 is an amplified vacuum from the venturi vacuum at a venturi 169 disposed in an induction passageway 27. This amplified vacuum is supplied to vacuum chamber 145 from a control apparatus 171. The example of such a control apparatus is disclosed U.S. Pat. No. 3,739,797, entitled "CONTROL APPARATUS FOR EXHAUST GAS RECIRCULATION SYSTEM" patented June 19, 1973. The control apparatus denoted by the reference numeral 50 and illustrated in FIG. 2 of this patent specification may be used as control apparatus 171 in this embodiment.

Referring to the embodiment shown in FIG. 6, it differs from the preceding embodiment shown in FIG. 1 or 2 in that instead of a pressure motor actuated flow control valve 63, a normally closed type solenoid actuated flow control valve 173 is used. A solenoid actuator 175, which when energized will move flow control valve 173 toward a maximum valve opening position or an open position, is circuited to receive a drive pulse 35 generated by a fuel injection control circuit 37 (see FIG. 1 also). As a control signal to be supplied to solenoid actuator 175, a control pulse having its width varying in proportion to an output voltage from an air flow meter 39 may be used.

What is claimed is:
1. An engine system comprising:
   a four-cycle internal combustion engine having a combustion chamber, a first intake port passage opening to said combustion chamber, an exhaust port passage opening to said combustion chamber, a second intake port passage opening to said combustion chamber, a first intake valve closing said first intake port passage and adapted to be opened to perform an intake cycle, an exhaust valve closing said exhaust port passage and adapted to be opened to perform an exhaust cycle, and a second intake valve closing said second intake port passage and adapted to be opened during a period overlapping said exhaust cycle and the subsequent intake cycle;
   an induction passageway connecting with said first intake port passage;
   a source of compressed air having a constant pressure;
   an injection passageway connecting said source of compressed air to said second intake port passage;
   a flow control valve fluidly disposed in said injection passageway; and
   control means whereby said flow control valve will vary effective flow area of said injection passageway in response to the flow rate of fluid passing through said induction passageway;
   said control means comprising
   sensor means for generating a first pressure signal indicative of the flow rate of fluid passing through said induction passageway;
   means for generating a second pressure signal which is an amplified one of said first pressure signal; and
   motor means for actuating said flow control valve in response to said second pressure signal.

2. An engine system as claimed in claim 1, in which said sensor means includes means defining a venturi within said induction passageway and said first pressure signal is venturi vacuum at said venturi.

3. An engine system as claimed in claim 1, in which said source of compressed air comprises:
   a surge tank to which said injection passageway is open;
   an air pump driven by said internal combustion engine having a suction port communicating with the open air through an air cleaner and a discharge port communicating with said surge tank; and
   a relief valve having a vent port opening to said surge tank.

4. An engine system as claimed in claim 1, in which said source of compressed air comprises:
   a surge tank to which said injection passageway is open;
   an air pump driven by said internal combustion engine having a suction port communicating with the open air through an air cleaner and a discharge port;
   a pressure regulator having a regulator chamber having an outlet port communicating with said surge tank and an inlet port; and
   a conduit means interconnecting said inlet port and said discharge port.

5. An engine system comprising:
   a four-cycle internal combustion engine having a combustion chamber, a first intake port passage opening to said combustion chamber, an exhaust port passage opening to said combustion chamber, a second intake port passage opening to said combustion chamber, a first intake valve closing said first intake port passage and adapted to be opened to perform an intake cycle, an exhaust valve closing said exhaust port passage and adapted to be opened to perform an exhaust cycle, and a second intake valve closing said second intake port passage and adapted to be opened during a period overlapping said exhaust cycle and the subsequent intake cycle;

an induction passageway connecting with said first intake port passage;

a source of compressed air having a constant pressure;

an injection passageway connecting said source of compressed air to said second intake port passage;

a flow control valve fluidly disposed in said injection passageway; and control means whereby said flow control valve will vary effective flow area of said injection passageway in response to the flow rate of fluid passing through said induction passageway;

said control means comprising sensor means for generating an electric signal indicative of the flow rate of fluid passing through said induction passageway;

means for generating a pressure signal indicative of said electric signal; and motor means for actuating said flow control valve in response to said pressure signal.

6. An engine system as claimed in claim 5, in which said sensor means includes an air flow meter and said electric signal is an output from said air flow meter.

7. An engine system as claimed in claim 5, in which said pressure signal generating means comprises:

fluid passage means, having an orifice therein, for interconnecting said motor means and said source of compressed scavenging air; and pressure regulator means, having an air vent port connecting with said fluid passage means at a section intermediate said orifice and said motor means, for controlling fluid flow passing through said air vent port in response to said electric signal.

8. An engine system as claimed in claim 7, in which said pressure regulator means comprises:

a solenoid actuated valve.

9. An engine system as claimed in claim 5, in which said pressure signal generating means comprises:

a source of constant vacuum;

fluid passage means, having an orifice therein, for interconnecting said motor means and said source of constant vacuum; and pressure regulator means, having an air bleed port connecting with said fluid passage means at a section intermediate said orifice and said motor means, for controlling fluid flow through said air bleed port in response to said electric signal.

10. An engine system as claimed in claim 5, in which said source of compressed air comprises:

a surge tank to which said injection passageway is open;

an air pump driven by said internal combustion engine having a suction port communicating with the open air through an air cleaner and a discharge port communicating with said surge tank; and a relief valve having a vent port opening to said surge tank.

11. An engine system as claimed in claim 10, further comprising relief passage means for interconnecting said vent port of said relief valve and said air cleaner.

12. An engine system as claimed in claim 5, in which said source of compressed air comprises:

a surge tank to which said injection passageway is open;

an air pump driven by said internal combustion engine having a suction port communicating with the open air through an air cleaner and a discharge port;

a pressure regulator having a regulator chamber having an outlet port communicating with said surge tank and an inlet port; and a conduit means interconnecting said inlet port and said discharge port.

13. An engine system as claimed in claim 12, in which said pressure regulator comprises:

a lever including an arm having a valve member attached thereto adapted to close said inlet port and an opposite arm;

a diaphragm member having one side subject to atmospheric pressure and an opposite side subject to pressure within said regulator chamber;

a connecting rod operatively connecting said opposite arm of said lever to said diaphragm member; and a spring to bias said connecting rod toward a position in which said lever urges said valve member to open said inlet port.

* * * * *